US006188907B1

(12) United States Patent
Reding et al.

(10) Patent No.: US 6,188,907 B1
(45) Date of Patent: Feb. 13, 2001

(54) ENHANCED TELEPHONE COMMUNICATION METHODS AND APPARATUS INCORPORATING PAGER FEATURES

(75) Inventors: Craig Reding, Midland Park, NJ (US); Suzi Levas, Yorktown; Menno Aartsen, Valhalla, both of NY (US)

(73) Assignee: Nynex Science & Technology, Inc., White Plains, NY (US)

(*) Notice: Under 35 U.S.C. 154(b), the term of this patent shall be extended for 0 days.

(21) Appl. No.: 08/907,856

(22) Filed: Aug. 8, 1997

(51) Int. Cl.$^7$ .................................................... H04Q 7/20
(52) U.S. Cl. .......................... 455/459; 455/426; 455/458; 455/515
(58) Field of Search .................................. 455/459, 426, 455/458, 31.2, 515, 414, 556, 460

(56) References Cited

U.S. PATENT DOCUMENTS

| | | |
|---|---|---|
| H610 | 3/1989 | Focarile et al. . |
| Re. 33,417 | 10/1990 | Bhagat et al. . |
| 4,618,860 | 10/1986 | Mori . |
| 4,661,972 | 4/1987 | Kai . |
| 4,747,122 | 5/1988 | Bhagat et al. . |
| 5,148,473 | 9/1992 | Freeland et al. . |
| 5,175,758 | 12/1992 | Levanto et al. . |
| 5,202,912 | 4/1993 | Breeden et al. . |
| 5,307,399 * | 4/1994 | Dai et al. ............................. 455/31.3 |
| 5,375,161 | 12/1994 | Fuller et al. . |
| 5,414,750 * | 5/1995 | Bhagat et al. ....................... 455/414 |
| 5,513,241 * | 4/1996 | Dimitriadis et al. ................ 455/31.3 |
| 5,526,398 * | 6/1996 | Okada et al. ........................ 455/426 |
| 5,541,976 | 7/1996 | Ghisler ................................... 379/57 |
| 5,550,861 * | 8/1996 | Chan et al. .......................... 375/222 |
| 5,566,227 * | 10/1996 | DeVaney ............................... 455/450 |
| 5,581,594 * | 12/1996 | McAfee .............................. 379/56.1 |
| 5,644,626 * | 7/1997 | Carlsen et al. ....................... 455/31.2 |
| 5,701,337 * | 12/1997 | Silver et al. .......................... 455/343 |
| 5,737,707 * | 4/1998 | Gaulke et al. ....................... 455/556 |
| 5,790,949 * | 8/1998 | Tognazzini .......................... 455/426 |
| 5,802,470 * | 9/1998 | Gaulke et al. ....................... 455/426 |
| 5,805,991 * | 9/1998 | Foladare et al. ..................... 455/406 |
| 5,950,128 * | 9/1999 | Ghisler ................................. 455/426 |

\* cited by examiner

Primary Examiner—Dwayne D. Bost
Assistant Examiner—Sonny Trinh
(74) Attorney, Agent, or Firm—Straub & Pokotylo; Michael P. Straub; John C. Pokotylo

(57) ABSTRACT

Methods and apparatus for implementing a telephone communication system incorporating pager features are described. In accordance with the present invention, when a call to a system subscriber is received, the subscriber is contacted by the telephone switch which receives the call via the use of a pager message, e.g., using a conventional pager system. If the subscriber has a pager module of the present invention, which receives the pager message directed to the subscriber inserted into an enhanced telephone of the present invention, the pager module will automatically initiate a call to the switch where the waiting call is being held or "parked". The automatically placed call will result in a connection between the switch and called party being established over conventional telephone lines. The connection with the switch is thus established automatically in a manner that is transparent to the subscriber. After verifying the identify of the responding party, the calling and called parties are connected. A signal from the contacted switch may be used to cause the enhanced telephone used to establish the connection with the switch to ring thereby signal the receipt of a call to the telephone subscriber. Because the methods and apparatus of the present invention can be implemented using pager technology and land-line telephones, many of the cost, privacy, power consumption, and regional compatibility problems encountered when using current cellular telephones are avoided.

20 Claims, 10 Drawing Sheets

ENHANCED TELEPHONE COMMUNICATION METHODS AND APPARATUS INCORPORATING PAGER FEATURES

FIELD OF THE INVENTION

The present invention relates to communication systems and, more particularly, to communication methods and apparatus for use in establishing a voice call connection between a calling party and a called party even when the called party's location is unknown to the communication system at the time a call transaction is commenced.

BACKGROUND OF THE INVENTION

The need to be able to contact and communicate with people while they are traveling has lead to the development of portable communications devices such as cellular telephones and pagers.

Most cellular telephones in use in the United States today enable a cellular telephone subscriber to place calls and to be called. This can be done while traveling throughout the range of the particular cellular system to which a cellular customer subscribes. Cellular phones of this type periodically send out radio signals to inform the cellular telephone system as to which cell the subscriber is in at any given moment in time. Because of the periodic transmission of location information, cellular phones of this type utilize a relatively large amount of power. For this reason, cellular phones routinely need their batteries to be replaced or recharged, sometimes after as little as a few hours of use. Thus, this known type of cellular phone suffers from power consumption requirements that frequently result in cellular phone customers keeping their cellular phones switched off for substantial periods of time during each day simply to conserve battery power. During such periods of time, the cellular phone customer can not be reached via the customer's cellular phone.

As an alternative to the above described type of cellular telephone, a type of cellular phone which is registered in a cellular system only when a call is made from the telephone has been suggested. This type of telephone, which is sometimes referred to as a "Telepoint " telephone, normally can only place calls and can not receive calls. Cellular phones of this type will be referred to herein explicitly as Telepoint cellular phones. References to cellular phones made herein which are not preceded by the word "Telepoint" are to be understood to be references to cellular telephones of the aforementioned type which are capable of receiving as well as initiating calls. In order to enhance the flexibility of Telepoint telephones, and attempt to overcome their inability to receive calls, the incorporation of a pager into a Telepoint cellular telephone has been suggested. U.S. Pat. No. 5,175,758 discusses one such system. In the system discussed therein, calls to a Telepoint cellular telephone are initiated by dialing the number of a pager incorporated into the Telepoint cellular telephone. Using the telephone number information incorporated into the pager message, the Telepoint cellular telephone can then respond to the page by initiating a telephone call. As a result of the telephone call, the Telepoint cellular telephone customer may be connected with the person attempting to call the Telepoint telephone subscriber, assuming of course, that the Telepoint cellular phone is turned on at the time the call to the pager number is initiated.

For various reasons, including ease of use, the aforementioned cellular telephones capable of receiving and placing calls, as opposed to the Telepoint cellular telephones which are usually limited to being able to place calls, have come into widespread use in the United States.

Unfortunately, present day cellular telephone service remains somewhat regional in nature, limiting the useful range of a cellular phone associated with a particular service provider. In addition, cellular phones designed to operate with one system may not operate with other systems. For example, cellular phones designed to operate in the United States will frequently be incompatible with cellular phone systems implemented outside the United States. This greatly limits the usefulness of cellular phones during periods of international travel. In many cases, cellular phone incompatibility precludes a cellular phone owner from registering the same cellular phone with different service providers across the country and/or throughout the world.

In addition to operational problems, cellular telephones commonly in use in the United States today confront their users with various, and often serious, privacy concerns. Since cellular telephones involve the use of radio broadcasts to transmit information, the information transmissions can be easily intercepted by third parties. The widespread problem of people listening in on cellular telephone conversations has resulted in suggestions that confidential business and/or personal information should not be discussed when a cellular telephone is being used. As discussed above, cellular telephones periodically provide the telephone company with information about the cellular telephone's location, and thus cellular telephone user's location. Presently, if an individual were to keep a cellular telephone that is turned on with them at all times, the telephone company would have information about the cellular telephone customer's location 24 hours a day. To many people, this location information represents an invasion of privacy which they would prefer to avoid.

In addition to cellular telephones, pagers present another way of contacting an individual while the individual is traveling. Pager's are well known one way communication devices which allow an individual to receive telephone numbers and/or text messages of relatively short duration via the use of radio transmissions. Because pagers only receive information and do not transmit data, e.g., location information, pagers generally require far less power to operate than cellular telephones. This generally allows pagers to operate for relatively long periods of time without having to recharge or replace their batteries. Because pagers normally only receive and display information, they tend to be more compact then cellular telephones. In addition, because the messages transmitted to pagers tend to be relatively short, and the transmission of such messages does not involve the expense of maintaining complex and costly mobile telephone switches, pager service generally tends to be far less expensive then cellular telephone service.

Various pagers currently in use today have the advantage of being compatible with some world wide paging services. The advent of world wide paging service allows a subscriber to such a system to be paged almost anywhere in the world without the need for the pager subscriber to be concerned about pager system compatibility.

Because pagers receive, but do not transmit information, the privacy concerns associated with cellular telephones generally do not exist in terms of pager use. That is, there are no communications from a pager subscriber to a pager system to be intercepted. In addition, the messages from the pager system to the subscriber tend not to include highly confidential information. Pager service also has the advantage that it does not involve the disclosure of a subscriber's location to the pager service.

In order to enhance the usefulness of pagers, the incorporation of operator controlled autodialers into pagers has been suggested to facilitate the dialing of telephone numbers included in pager messages. Reissue U.S. Pat. No. 33,437 describes one system wherein an autodialer and pager are incorporated into a cellular phone. Under control of the operator, the autodialer can be used to initiate calls, via the cellular telephone, to telephone numbers received as part of a pager message. The incorporation of a pager and autodialer into a cellular telephone allows the cellular phone user to selectively dial a telephone number received in a pager message, without having to manually enter, into the cellular phone, the full telephone number to be dialed.

Despite the incorporation of autodialers into pagers, and even the combination of a pager/autodialer/cellular phone such as the one described in Reissue Pat. No. 33,417, a major disadvantage of pagers is that a caller attempting to contact a person via a call to a pager must still normally wait for some action on the pager subscriber's part to initiate the return of a call.

In view of the above, it becomes apparent that known systems for contacting individuals who travel from location to location suffer may present problems relating to the cost of service, worldwide compatibility and the time involved in establishing an actual voice connection with a party. In addition to these many problems, cellular telephone communication systems suffer from the various privacy problems discussed above. The relatively high cost associated with cellular telephone service, as compared to land based telephone service, is also a disadvantage of current cellular phone systems.

Accordingly, there is a need for improved communications methods and apparatus capable of establishing a voice call between a calling party and a remote party. It is desirable that such methods and apparatus be capable of establishing a call connection without having to provide the calling party or the telephone company with prior information about the called party's location. In addition, it is desirable that calls be capable of being established without the use of cellular telephones and the privacy and cost problems associated therewith. It is also desirable that any new communication methods and apparatus be capable of providing call establishment capability over a wide regional area and at a reasonable cost.

SUMMARY OF THE PRESENT INVENTION

The present invention relates to communication systems which combine telephone and pager features to allow voice call connections to be established between a calling party and a called party even when the called party's location is unknown to the communication system at the time a call transaction is commenced.

In accordance with the present invention, pager capabilities are incorporated into telephones, refereed to herein as enhanced telephones. These telephones may be of either the land-line or cellular type. The pager capabilities may be provided by a removable pager module which is carried with a subscriber during travel and then inserted into an enhanced telephone at the subscriber's temporary location.

In accordance with the present invention each subscriber is provided with an assigned phone number (APN). When a call is placed to the APN the telephone central office switch responsible for processing the call to the APN effectively puts the calling party on hold or "parks the call" as is known in the art. The central office switch then attempts to contact the enhanced telephone service subscriber. This may be done by first attempting to contact the subscriber using a primary telephone number associated with the called APN. If the subscriber can not be reached using the primary phone number the switch then initiates a paging operation using a pager access number (PAN) associated with the subscriber.

As part of a transmitted pager message, the switch may include an enhanced call indicator and/or the telephone number of the switch where the call is parked. The pager message may be broadcast over a large geographic region and even word-wide using existing pager systems.

If the subscriber to the enhanced telephone service of the present invention has his or her pager module on and inserted into an enhanced telephone, the enhanced telephone pager message will be received by the pager module. In response to the enhanced telephone pager message, the pager module automatically controls the enhanced telephone into which it is inserted to place a call to a telephone number corresponding to the switch responsible for servicing calls to the APN. This telephone number may be obtained from the pager module's memory and/or from the enhanced telephone pager message.

Upon establishing contact with the central office switch where the call to the APN is parked, the identity of the responding party is verified. This is done in one embodiment by comparing a pager access number (PAN) and user access code (UAC) transmitted by the pager module responding to the pager message to subscriber information stored in a database located at the central office switch. If the responding party's identity is verified, the central office switch establishes a connection between the calling and called parties.

After identity verification, the central office switch sends an acknowledgement signal to the enhanced telephone and thus the pager module responding to the enhanced telephone pager message. Upon receiving the acknowledgement signal, the pager module actives a buzzer or ringer included in the module to signal to the subscriber an incoming call. Upon answering the phone in response to the pager module's signal, a voice connection is established between the calling and called parties.

The present invention has the advantage of allowing a traveling party to receive telephone calls over a wide geographic region without having to disclose information about the subscriber's whereabouts prior to the time of the call. In addition, because the present invention can be implemented without using relatively expensive cellular telephone technology it does not suffer from many of the cost, power consumption, privacy and worldwide system compatibility problems associated with cellular telephones.

While the present invention need not use cellular telephone technology, in one embodiment the pager features of the present invention are combined with a cellular telephone capable of receiving as well as placing calls. When the transmitter/receiver of the enhanced cellular telephone is turned off and the pager module inserted into the enhanced cellular telephone turned on, enhanced telephone pager messages can still be received by the pager module. Upon receiving an enhanced telephone pager message, the pager module automatically activates the enhanced cellular telephone's receiver/transmitter and places a call to the switch responsible for processing calls to the subscriber's APN without any action on the cellular phone operator's part. Upon verifying the responding party's identify, the called switch will establish a voice connection between the calling party and the called party as described above.

In view of the above, it is apparent that the present invention has obvious privacy, security and cost advantages over prior art communication systems used to establish telephone calls.

In addition to the above described embodiments and features, numerous additional features, embodiments and advantages of the methods and apparatus of the present invention are discussed below.

BRIEF DESCRIPTIONS OF THE DRAWINGS

DETAILED DESCRIPTION

As discussed above, the present invention is directed to communication methods and apparatus for use in establishing a voice call connection between a calling party and a called party even when the called party's location is unknown to the communication system at the time a call transaction is commenced.

The apparatus of the present invention will first be discussed followed by a detailed discussion of how the apparatus of the present invention can be used to implement the new and novel communications methods of the present invention.

Figure 1:
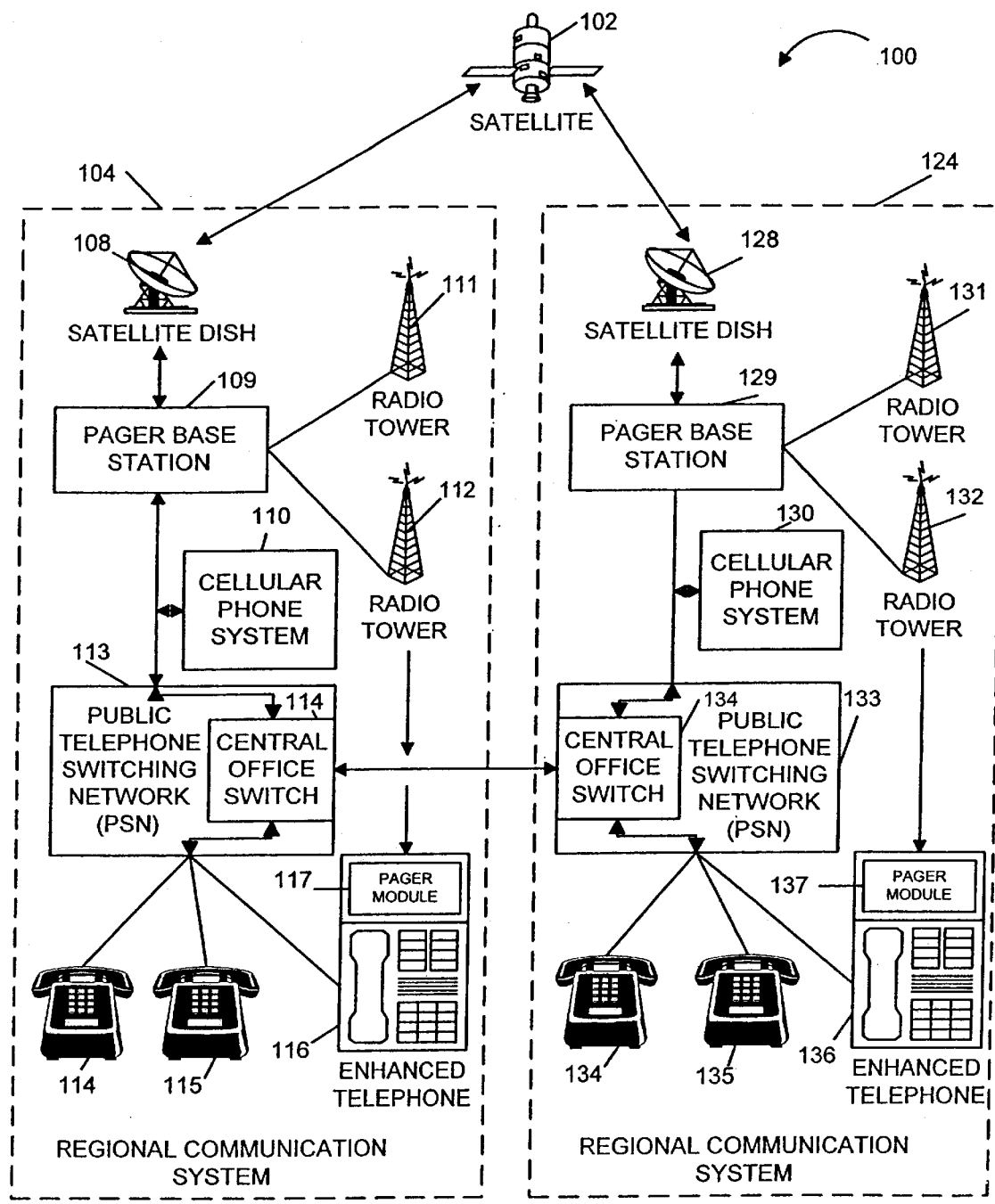
FIG. 1 illustrates a communication system implemented in accordance with the present invention.

FIG. 1 illustrates a communication system 100 implemented in accordance with one exemplary embodiment of the present invention. As illustrated, the system 100 includes first and second regional communication systems 104, 124 and a satellite 102 for communicating pager information, e.g., pager messages, there between. While only two regional communications systems are shown, any number of such systems and/or satellites may be incorporated into the system 100 of the present invention. In fact, a sufficient number of regional communication systems and satellites may be employed to provide worldwide system coverage if desired.

Each one of the regional communication systems includes a public telephone switching network (PSN) 113, 133 comprising one or more central office switches used for processing, routing and/or generating billing information relating to telephone calls. The public switching network 113, 133 and the central office switches 114, 134 included therein in particular, are coupled to a plurality of landline telephones included in the corresponding regional communication system (114, 115, 116) (134, 135, 136). One or more of the phones 116, 136 included in each regional communication system 104, 124 are enhanced telephones implemented, as will be discussed in further detail below, in accordance with the present invention. The enhanced telephones 116, 136 of the present invention include a pager module interface suitable for coupling the enhanced telephone 116, 136 to a pager module 117, 137 which are also implemented in accordance with the present invention. In FIG. 1, pager modules 117, 137 are illustrated as being inserted into enhanced telephones 116, 136, respectively. Use of the pager modules 117, 137 and enhanced telephones 116, 136, to enable the completion of a telephone call initiated by a calling party from another telephone, will be discussed in detail below.

In addition to being coupled to the landline telephones included in the regional communication system 104, 124, the PSN 113, 133 of each regional communication system 104, 124 is coupled to a corresponding regional cellular phone system 110, 130, a corresponding pager base station 109, 129 and to the PSN(s) of the other regional communication systems 104, 124. The connection between PSNs and the central office switches included therein, of the regional communication systems may be implemented using conventional telephone lines, e.g., fiber optic cables or other known methods of connecting remotely located telephone switches together.

The cellular telephone systems of each regional communication system 104, 124 may include, e.g., a mobile telephone switching office (MTSO), a plurality of conventional cellular telephones and/or a plurality of enhanced cellular telephones which are similar to conventional cellular telephones but include a pager module or pager module interface in accordance with the present invention. As will be discussed below, the enhanced cellular telephones, unlike known cellular phones, include an interface which is capable of initiating and receiving calls as well as circuitry for automatically initiating a call to a telephone number received in a pager message or stored in memory in response to a pager message, without the cellular telephone user's involvement in initiating the call.

The pager base station 109, 129 of each regional communication system may be implemented using conventional pager hardware. In accordance with the present invention, the pager base station 109, 129 is coupled to a corresponding PSN 113, 133. The pager base station receives messages from the PSN 113, 133. These messages are transmitted by the regional pager base station 109, 129 via the corresponding regional satellite dish 108, 128 and from a plurality of radio towers (111, 112), (131, 132). The radio towers are used for transmitting messages via radio signals to conventional pagers and pager modules located in the pager base station's regional communication area. They are also used for re-transmitting pager messages received by a regional pager base station 109, 129 from another regional pager base station via the satellite 102 and regional satellite dish 108, 128.

The use of the satellite 102 to transmit messages between regional pager base stations 109, 129 allows a pager message to be transmitted from one pager base station 109, 129 to a plurality of remotely located pager bases stations. With each pager base station broadcasting the pager message via its set of radio towers to the pager base station's regional area, a pager message may be broadcast over an enormous geographic area, even worldwide, in a relatively small amount of time.

Significantly, the communication system 100 of the present invention can be implemented using existing pager, cellular telephone, and public telephone switching networks without requiring major hardware modifications thereto. As will be discussed below, software modifications can be made, e.g., to the central office switches of the PSNs, to render the switches compatible with the enhanced landline and enhanced cellular telephones of the present invention.

Accordingly, one advantage of the present invention is that it can be readily implemented using existing pager, landline and cellular telephone communications infrastructure in combination with the new and novel enhanced telephones of the present invention.

Figure 2:
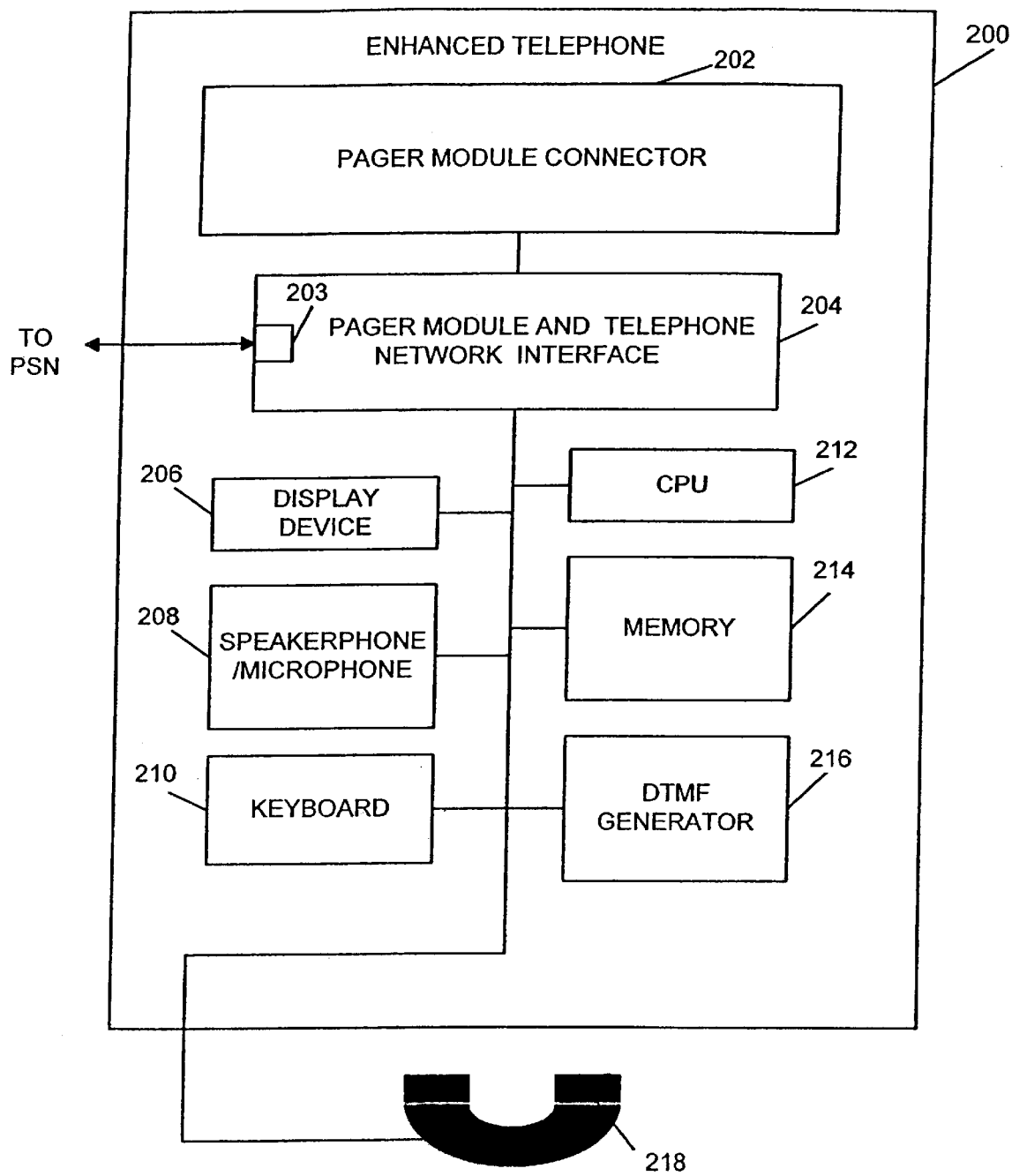
FIG. 2 illustrates an enhanced telephone, suitable for use as a land-line telephone, implemented in accordance with the present invention.

Referring now to FIG. 2, there is illustrated an enhanced telephone implemented in accordance with the present invention. The enhanced telephone 200 includes a pager module connector 202, a pager module and telephone network interface 204, a display device 206, a speakerphone/microphone 208, a keyboard 210, a CPU 212, a memory 214, a DTMF generator 216, and a handset 218. As will be apparent to one of ordinary skill in the art, the enhanced telephone 200 includes many components and features found in a conventional desktop business telephone. However, unlike conventional telephones, it also includes the pager module connector 202 and the pager module and telephone network interface 204. The pager module and telephone network interface 204 includes a modular connector 203 for electrically connecting the enhanced telephone 200 to a conventional telephone line. The interface 204 is responsible for performing any necessary protocol conversions and interfacing between the pager module connector 202, the circuitry of the enhanced telephone 200 and the PSN or central office switch 114, 134 to which it is coupled.

Figure 3A:
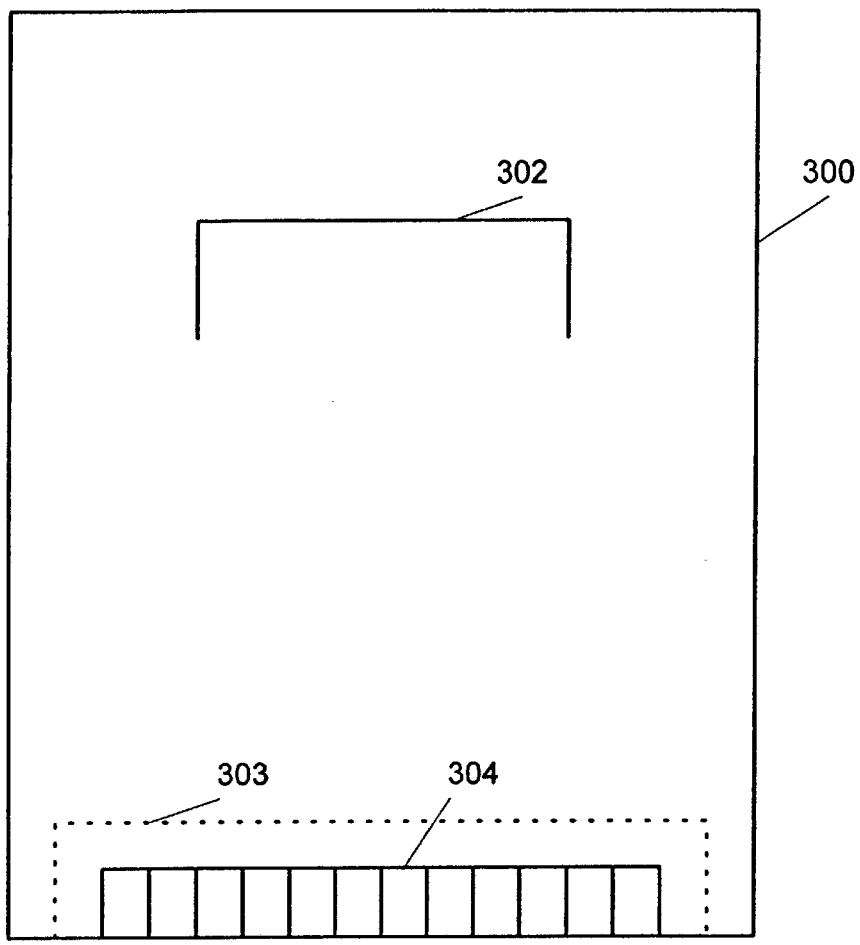
FIGS. 3A and 3B are various views of a pager module implemented in accordance with one embodiment of the present invention.
Figure 3B:
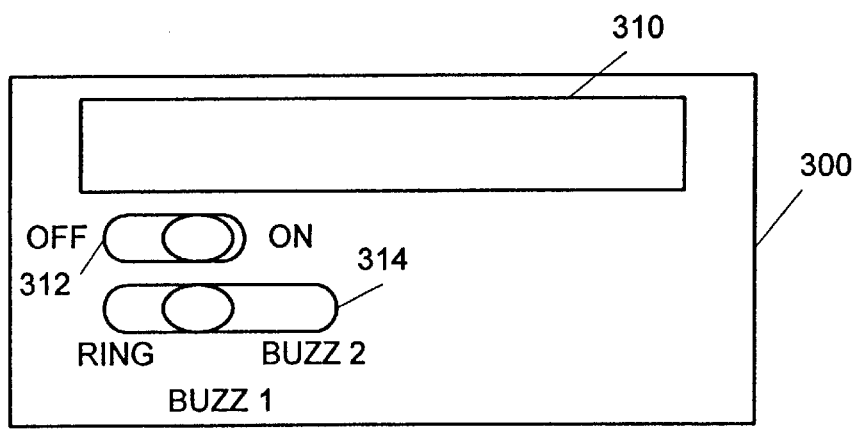
Figure 3C:
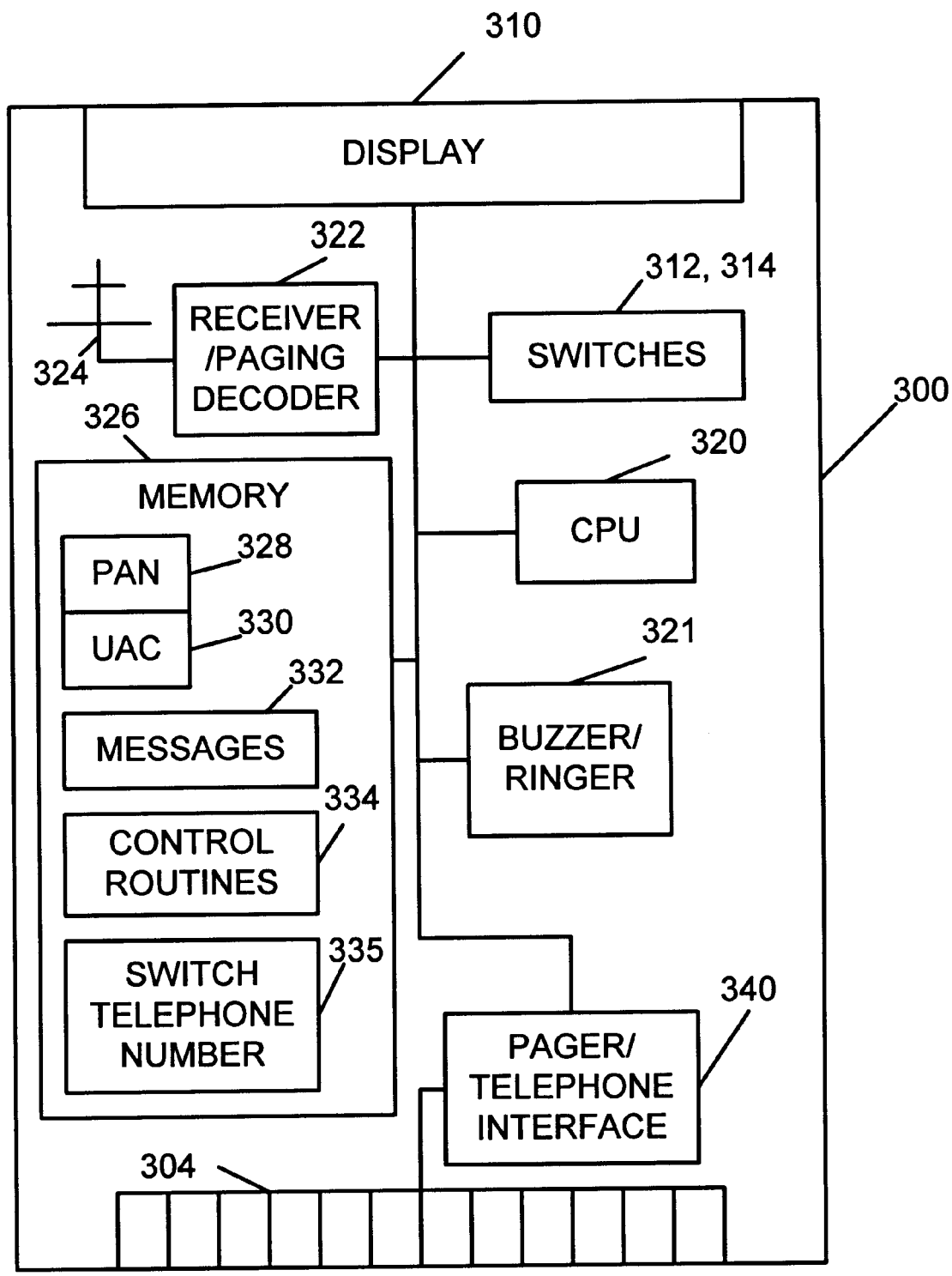
FIG. 3C is a block diagram illustrating various components of the pager module of the present invention illustrated in FIGS. 3A and 3B.

In accordance with the present invention a portable pager module such as the one illustrated in FIGS. 3A, 3B, and 3C can be inserted into the pager module connector 202. Upon insertion, electrical contact is established between the inserted pager model and the enhanced telephone pager module connector 202. Once inserted, information, data and instructions can be communicated between the inserted pager module 300, the PSN and the various circuits of the enhanced telephone 200 coupled to the interface 204.

In one particular embodiment, the enhanced telephone's connection to a PSN 113, 133 is terminated upon the removal of a pager module from the pager module connector 202 and only maintained so long as a pager module is inserted into the pager module connector 202. This telephone disconnect feature facilitates call routing in accordance with one embodiment of the present invention which will be discussed below.

The CPU 212, of the enhanced telephone 200 controls operation of the telephone in accordance with instructions stored in the memory 214, and/or memory included in a pager module inserted into to the pager module connector 202. A telephone call may be initiated from the enhanced telephone 200 by entering a telephone number via the keyboard 210 and/or automatically via instructions received from a pager module inserted into the pager module connector 202.

A pager module 300, implemented in accordance with one exemplary embodiment of the present invention, will now be discussed with reference to FIGS. 3A, 3B and 3C.

FIG. 3A shows the back of the pager module 300. From this view, the clip 302 used, e.g., for attaching the pager module 300 to a belt, is visible. The doted line 303 is used to indicate a portion of the pager module housing which is illustrated as being cutaway to reveal the terminal connectors 304 located in a recess of the pager module housing. The terminal connectors 304 may be part of a printed circuit board positioned between the front and back portions of the pager module housing. Pager module components including, e.g., memory 326, CPU 320, display, etc. are mounted on the printed circuit board. The bottom of the housing 300, in the area of the terminal connectors 304 is open thereby allowing the terminal connectors 304, to make contact with corresponding terminals of a pager module connector 202 upon insertion into an enhanced telephone 200.

FIG. 3B is a top view of the pager module 300 of the present invention. From this view a display 310, an ON/OFF switch 312, and a ringer select switch 314 are visible. The display 310 is used for displaying telephone numbers and/or alpha/numeric data which is received, e.g., as part of a pager message. The ON/OFF switch 312 is used for powering the pager module 300 on and off while the ringer switch 314 is used to select one of a plurality of possible ringer modes so that a ringing or buzzing sound which is distinct from other phones or pagers in use in the area can be selected.

FIG. 3C is a block diagram illustrating various components of the new and novel pager model 300 of the present invention. As illustrated, the pager module 300 includes the display 310, the switches 312, 314, a CPU 320, an antenna 324, a receiver/paging decoder circuit 322, a buzzer/ringer 321, a memory 326 and a pager/telephone interface 340 all coupled together as illustrated in FIG. 3C. The CPU 320 is used for controlling the operation of the pager module 300 under the direction of one or more control routines 334 stored in memory. The buzzer 321 is used for generating one or more distinct buzzing or ringing signals used to indicate the receipt of a pager message, e.g., via operation of the radio receiver/pager decoder 322. As will be discussed below, when performing various operations, e.g., processing pager messages and/or initiating calls to a central office switch in response to a pager message, the CPU 320 may utilize a pager access number (PAN) 328 and/or a user authorization code (UAC) 330 stored in the memory 326. In addition to storing control routines 334, the PAN 328 and UAC 330, the memory 326 is used to store messages received, e.g., via the antenna 324 and receiving/paging decoder 322. The messages may be displayed and/or used in initiating a call to a central office switch or other telephone number, via an enhanced telephone 200, in accordance with the present invention.

A central office switch 400 which can be used to implement the public switching network of the communication system of the present invention, will now be described with reference to FIG. 4. The switch 400 may be one of several of such switches which form the regional PSNs 113, 133. The central office switch 400 may be implemented using any one of a plurality of commercially available telecommunications switches including e.g., "class 5" digital telephone switches, various programmable switches from Summa Four Corporation, AT&T's No. 5 ESS, Northern Telcom's DMS-100, etc. Accordingly, the central office switch 400 can be implemented using conventional hardware with various software and/or control modifications being made thereto in accordance with the present invention.

Figure 4:
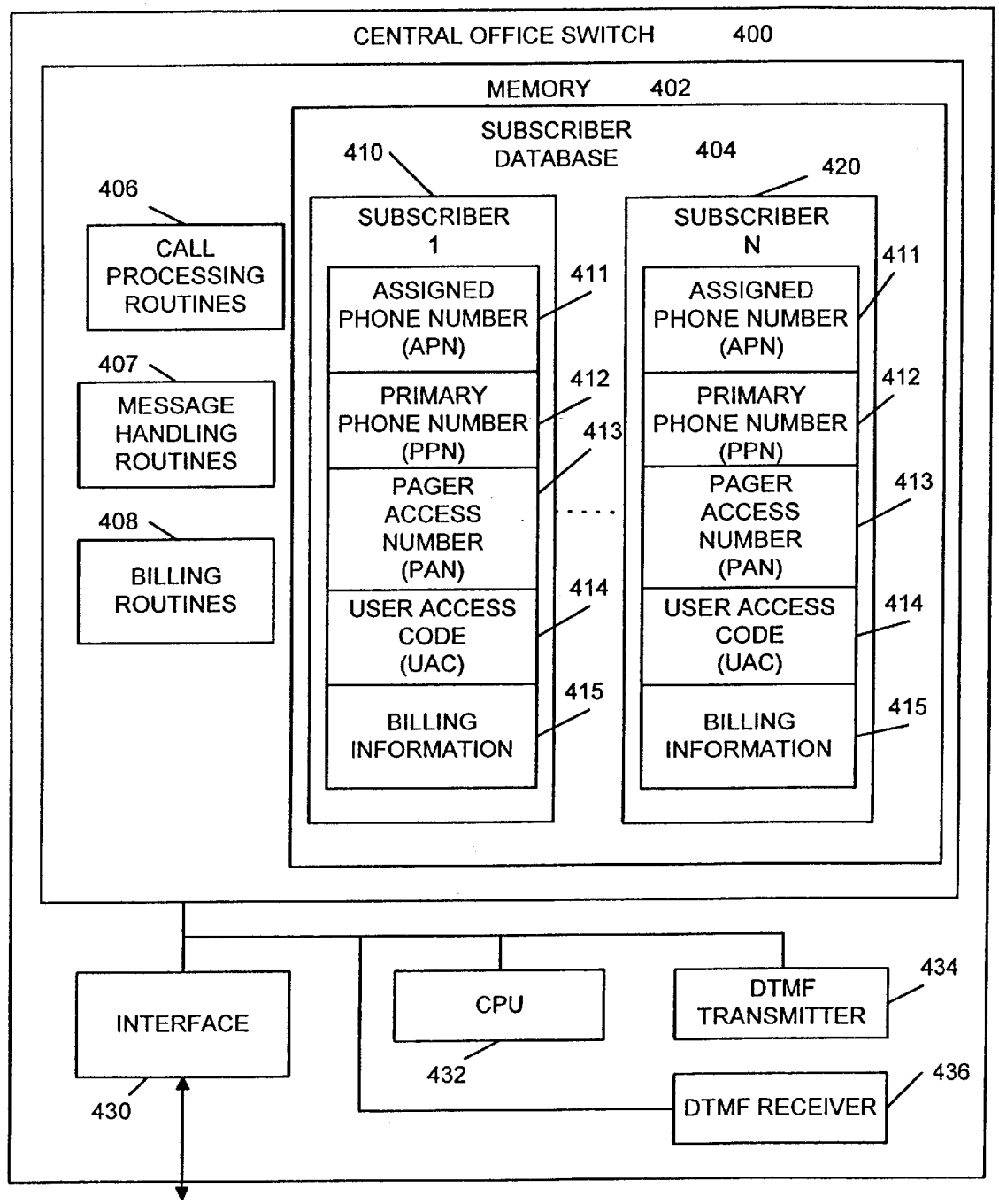
FIG. 4 is a block diagram of a central office switch suitable for use in the public switching network illustrated in FIG. 1.

As illustrated, the central office switch 400 includes a memory 402, a CPU 432, a DTMF transmitter 434 and a DTMF receiver 436 coupled together as illustrated in FIG. 4. The CPU 432 is used to control switch operation as a function routines and information stored in the memory 402. The DTMF transmitter and receiver 434, 436 are used for call routing and call initiation purposes. Via the interface 430, the switch 400 can communicate with the corresponding regional pager base station (109, 129), corresponding regional cellular phone system (110, 130), and transmit and receive signals from the telephones (114, 115, 116 or 134, 135, 136) coupled to the PSN (113 or 133). The central office switch 400 is coupled, e.g., via fiber optic lines and interfaces, to the central office switches 400 of other PSNs. This allows the central office switch 400 of each regional communication system to establish calls between telephones located in the same or different regional communication systems 104, 124.

Figure 5:
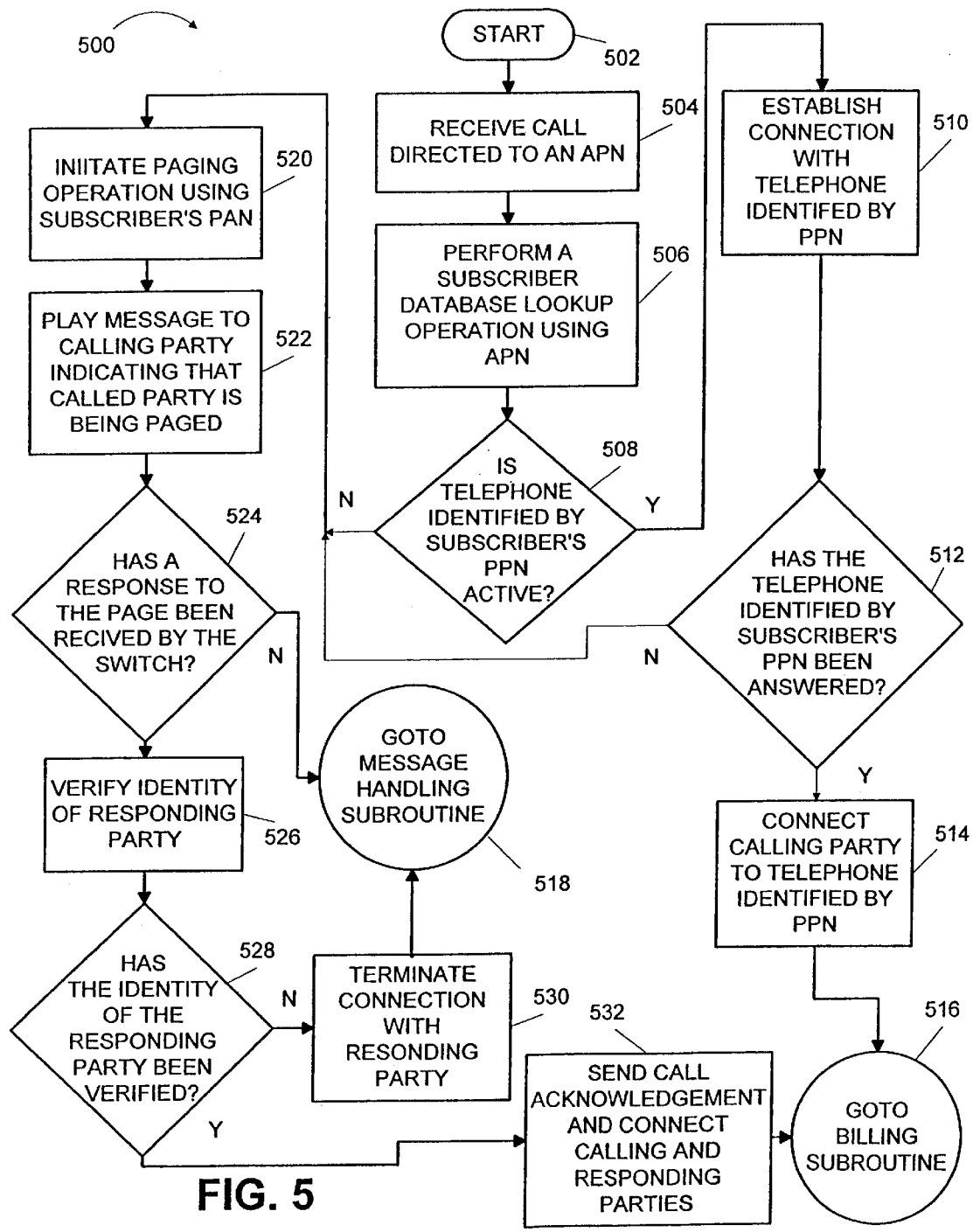
FIG. 5 is a flow chart illustrating the steps of a call handling routine performed by a central office switch when servicing a telephone call in accordance with the present invention.

The memory 402 of the switch 400 includes call processing routines 406 used to control the CPU when processing calls and establishing calls between a calling and called party, e.g., in accordance with the present invention. FIG. 5 illustrates the steps of one exemplary call processing routine 500. In addition, the memory 402 includes message handling and billing routines used by the CPU 432 in processing calls. In addition to various routines 406, 407, 408, the memory 402 also includes a subscriber database 404. The subscriber database 404 includes information, in the form of a plurality of data entries 410, 420, relating to each individual or party who subscribes to the enhanced telephone service of the present invention.

In the FIG. 4 embodiment, for each enhanced telephone service subscriber in the switch's regional calling area, the subscriber database 404 includes a set of database entries, e.g., 410, 420. The database entries include for each subscriber, that is subscriber 1 through subscriber N, an assigned phone number (APN) 411, a primary phone number (PPN) 412, a pager access number (PAN) 413, a user access code (UAC) 414, and billing information 415. The APN 411, PPN 412, PAN 413, and UAC 414 assigned to each subscriber is unique, i.e., different, from the corresponding numbers assigned to the other subscribers.

The APN 411 is the telephone number which is assigned to a subscriber. This telephone number represents a virtual telephone number that can be used to reach the subscriber regardless of his location assuming that the subscriber's pager module is plugged into an enhanced telephone and turned on at the time a call is made to the APN. The PPN is a subscriber's principal phone number. This number corresponds to a particular telephone located, e.g., at the subscriber's principal place of business. In most cases, the PPN 412 selected by the subscriber e.g., as a phone number to try reaching the subscriber at prior to performing a paging operation, corresponds to the actual physical telephone where the subscriber will most likely be located. Because the APN can be assigned independently from a PPN which is associated with a telephone at a particular physical location, an APN may be retained by an enhanced telephone subscriber despite one or more changes to the subscriber's PPN during the period of the enhanced telephone subscription.

The PAN 413 represents a pager access number corresponding to the particular subscriber's pager module 300. The PAN 413, is used when transmitting pager numbers to the subscriber, e.g., via one or more pager base stations 109, 129. The user access code UAC 414 is a security code assigned to each individual subscriber. A subscriber's PAN 413 and UAC 414 are stored both in the subscriber database 404 and the corresponding subscriber's pager module 300. As will be discussed below, when attempting to complete a call in response to a received pager message, the UAC 330, stored in the pager module 300, is provided by a subscriber's pager module 300 to the central office switch 400 where the pager message originated. The central office switch 400 only completes the call if the received UAC 330 for the particular subscriber attempting to complete a call matches the UAC 414 stored in the subscriber database for the particular subscriber. In order to increase security, the UAC 414 may be modified, e.g., incremented or decremented, by both the pager module 300 and switch 400, with each successful call transaction. This eliminates or reduces the possibility of an unauthorized individual being able to intercept another persons calls, by contacting the central office switch 400 in response to a pager message and supplying the subscriber's PAN and a previously intercepted UAC 330 to the switch 400. This added security also reduces the risk that enhanced telephones will be used to fraudulently make or complete calls at a legitimate subscriber's expense.

The subscriber billing information 415 includes, e.g., subscriber name and billing address information and/or billing rate information.

Figure 6:
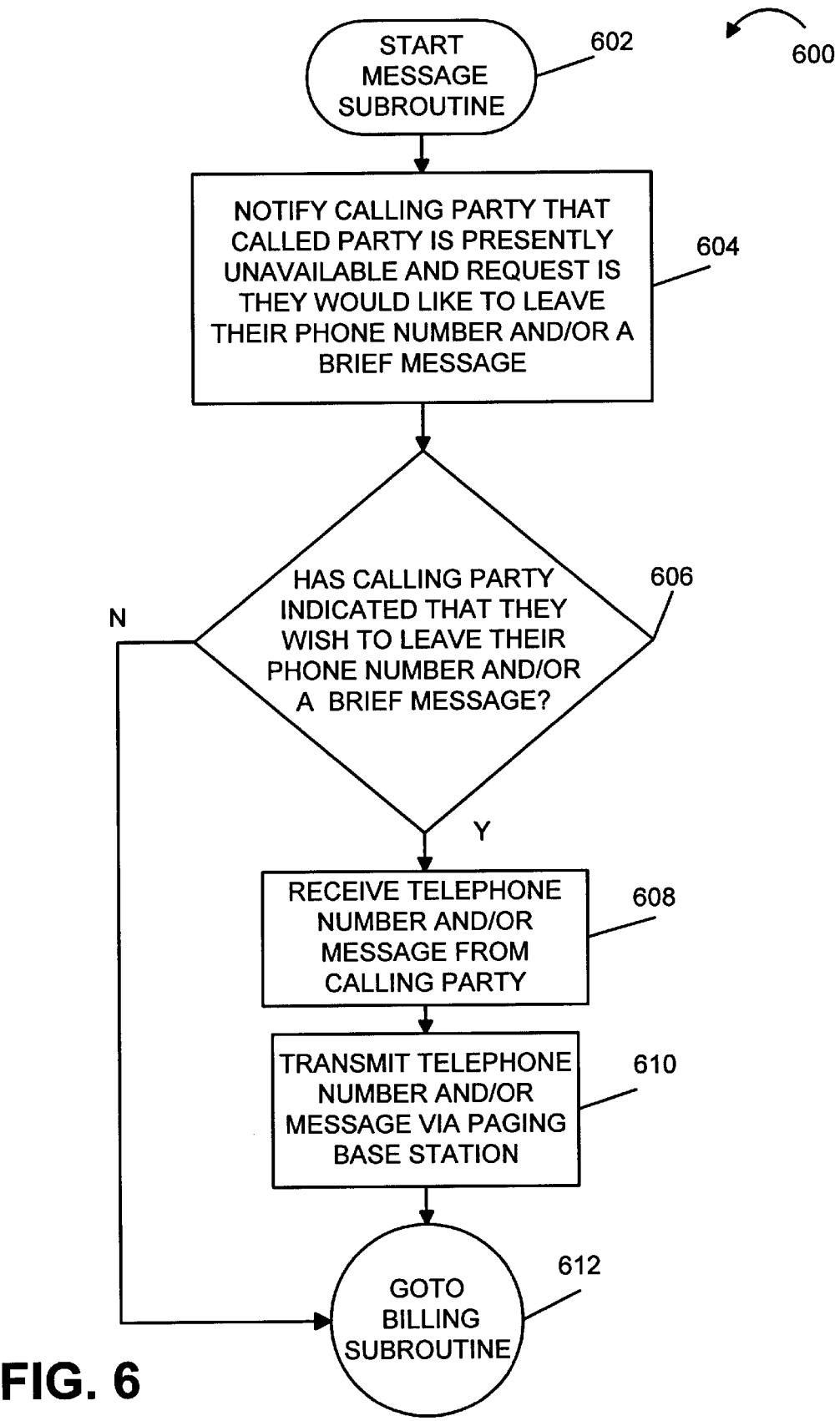
FIG. 6 illustrates the steps of a message subroutine implemented in accordance with the present invention, suitable for use in combination with the call handling routine illustrated in FIG. 5.

Operation of the communication system 100, in accordance with the method of the present invention, will now be described with reference to the flow charts of FIGS. 5–7 which illustrate the steps performed by a central office switch 400 when establishing a call with an enhanced telephone 200 in accordance with the present invention.

Processing of a call transaction in accordance with the present invention begins with step 502, the start step. In step 502 central office switch initialization occurs. This involves, e.g., supplying various call processing routines 406, stored in the switche's memory, to the CPU 432. After initialization in the start step 502, the central office switch 400 is prepared to receive and process a call directed, e.g., to an enhanced telephone subscriber.

A call to an enhanced telephone subscriber is initiated by a telephone customer, i.e., the calling party, dialing the subscriber's APN 411. This may be done from, e.g., a standard landline phone, a cellular telephone or an enhanced cellular or land-line telephone. As a result of the calling party dialing the APN, the regional PSN routes the call to the central office switch 400 corresponding to the dialed APN. Call routing to this point is performed in a conventional manner.

In step 504, a call to an APN corresponding to a particular central office switch 400 is received by the switch. In step 506, the central office switch 400 performs a subscriber database lookup operation using the APN to which the call is directed as an index into the subscriber database 404. As a result of the database lookup operation performed in step 506, the appropriate subscriber's database information is retrieved, including the PPN 412 and UAC 414 which correspond to the APN 411 used to perform the lookup operation.

From step 506, operation progresses to step 508 wherein the switch 400 determines if the telephone identified by the called subscriber's PPN 412, retrieved from the database 404, is active. As discussed above, in one embodiment, when the pager module 300 is removed from the enhanced telephone 200, the telephone 200 is disconnected. That is, the connection between the enhanced telephone 200 and the telephone line which couples it to the switch 400 is interrupted or disconnected. The disconnected or interrupted connection between the enhanced telephone 200 and switch 400 is detected by the switch and interpreted as an indication that the PPN 412 is not active.

It is expected that when an enhanced telephone service subscriber travels, he or she will take his or her pager module 300. Thus, when the enhanced telephone identified by the called subscriber's PPN 412 is disconnected, e.g., as a result of the removal of the pager module 300, it indicates that the subscriber can not be reached using the subscriber's PPN 412. In such a case, the switch 400 does not waste time in attempting to contact the subscriber using the PPN or waiting for the telephone identified by the PPN to be answered before sending a pager message.

If in step 508 it is determined that the subscriber's PPN is active, i.e., the enhanced telephone 200 is connected, operation progresses to step 510 wherein a connection is established between the switch and the called subscriber's telephone, e.g., an enhanced telephone 200. During this step 510, the subscriber's telephone is made to ring.

In step 512, a determination is made as to whether the telephone identified by the called subscriber's PPN has been answered. If, in step 512, it is determined that the telephone has been answered, the calling party is connected by the switch 400, in step 514, to the subscriber's telephone identified by the subscriber's PPN. Communication between the calling party and the party (presumably the called party) answering the telephone identified by subscriber's PPN 412 is thus established with the answering of the telephone identified by the PPN. With the establishment of the voice connection between the calling and called parties, operation progresses in step 516 to the billing subroutine where the parties are billed for services rendered.

Conventional telephones 114, 115 may be coupled to a telephone line corresponding to the PPN. This may result in the telephone line being connected to an operating telephone even when the pager module is removed from an enhanced telephone 200 coupled to the same telephone line. Accordingly, in some cases a telephone line identified by a PPN 412 may be active even when the enhanced telephone service subscriber has taken his or her pager module 300 with him or her when traveling. This may result in an unsuccessful attempt first being made to reach the subscriber at the telephone identified by the enhanced telephone service subscriber's PPN 412.

In step 512, if, after a preselected amount of time, it is determined by the switch 400 that the telephone identified by the subscriber's PPN 412 has not been answered, operation will progress to paging step 520.

If, in step 508, it is determined that the telephone identified by the subscriber's PPN was inactive operation progresses directly to step 520 without spending time attempting to reach the subscriber via use of the PPN.

In step 520, the switch 400, to which the calling party is connected as a result of dialing the subscriber's APN 411, initiates a paging operation. This is done via the switch's connection to the corresponding regional pager base station 109 or 129. The pager message which the switch 400 causes to be transmitted includes the pager module's PAN 413. The PAN 413 is used to identify the particular pager module 300 to which the message is directed. The transmitted pager message also includes an enhanced telephone call indicator, e.g., a preselected series of alpha/numeric characters and/or a telephone number, referred to herein as a return call number. The return call number corresponds to the switch 400 which initiated the message. In the case where only the PAN 413 and an enhanced telephone call indicator are transmitted, the pager module 300 retrieves from memory and uses a stored telephone number 335, corresponding to the switch 400 which is responsible for handling calls directed to the subscriber's APN, as the return call number. Dialing of the return call number, e.g., by an enhanced telephone of the present invention under control of the called parties pager module 300, in response to a pager message, results in the switch 400, which initiated the pager message, being contacted.

In accordance with the present invention, by using a pager system with satellite communications capability, the pager message may be transmitted to a plurality of pager base stations around the world. Such pager base stations are responsible for re-transmitting the pager message in their own regional communications areas using conventional radio signals. In this manner, a subscriber to the enhanced telephone service of the present invention can be reached worldwide via the use of a relatively inexpensive paging service.

After the switch 400 initiates the paging operation in step 520, in step 522 it plays a message to the calling party indicating that the called party is being paged and requesting that they hold on the line. Operation then progresses to step 524 where, after a preselected amount of time, e.g., sufficient for the paging message to be broadcast over a wide geographic region and a response received thereto, the switch 400 determines if a response to the pager message has been received. Such a response will normally include the PAN 328 and UAC 330 of the responding pager module 300. The pager module response to the switch 400 is normally received by the switch in the form of a telephone call, automatically initiated by the pager module 300, to the telephone number of the switch 400 provided in the pager message or retrieved from memory.

In step 524, if it is determined that no response to the page initiated by the switch 524 is received in a preselected period of time, operation progresses to step 518 wherein the method proceeds to the message handling subroutine, e.g., to take a message from the called party.

However, if, in step 524, a response to the page initiated by the switch 400 is received, operation progresses to step 526. In step 526, the identity of the responding party is verified by the switch 400. This is done, e.g., by the switch 400 using a PAN and a UAC received from the pager module 300 as part of the response. If the received UAC matches the expected UAC, e.g., the UAC 414 included in the switch's memory 402 corresponding the to PAN 413 included in the pager message, the identity of the responding party is confirmed. However, if the received PAN and UAC do not match the expected PAN 413 and UAC 414 identity verification does not result and, in fact, the miss-match is indicative of an attempt to intercept another individual's calls.

In step 528, if the identity of the responding party has not been verified, operation progresses to step 530 wherein the connection with the responding party is terminated. In this step appropriate action may also be taken to investigate the apparent fraudulent attempt to intercept the called party's telephone call. From step 530, operation progresses to the message handling routine via step 518.

In step 528, if it is determined that the identity of the responding party has been verified, operation progresses to step 532. In step 532 an acknowledgement signal is sent to the responding pager module 300 indicating that the switch is ready to connect the called and calling parties. In addition, the switch 400 proceeds to connect the called party responding to the pager message and the calling party which initiated the call transaction together. Thus, when the called party lifts the handset of the enhanced telephone into which the pager module 300 is inserted, in response to the pager module buzzing upon receiving the acknowledgement signal from the switch 400, the called and calling parties will be in voice contact with each other. At this point, the subscriber's UAC may be modified in systems which alter the UAC upon each successful call transaction. After the called and calling parties are connected, operation progresses to the billing subroutine in step 516.

The switch message handling subroutine 600 illustrated in FIG. 6 will now be described. As illustrated, the message handling subroutine 600 begins with the start step 602 wherein various system initialization operations are performed. Operation progresses to step 604 wherein the calling party is notified that the called party is presently unavailable. The switch 400 also makes an audible request to the calling party inquiring if they would like to leave their phone number and/or a brief message for the calling party. A response to the inquiry and/or the phone number/message to be left may be entered using the keys of the calling party's telephone as is done in the case of conventional pager messages.

In step 606 a determination is made as whether or not the calling party has indicated that they wish to leave their phone number and/or message. If, in step 606, it is determined that no phone number and/or message is to be left, operation progresses directly to the billing subroutine via step 612.

However, in step 606, if it is determined that the calling party will leave a phone number where it can be reached and/or a message, operation progresses to step 608 where the telephone number and/or message are received from the calling party. In step 610, the switch 400 formulates a paging message using the received telephone number and/or message and the called party's PAN 413. The message is then transmitted by the switch 400, via the pager base station coupled thereto, as a conventional pager message to be received and stored by the called party's pager module. The called party may then contact the calling party by using the received telephone number as is done in conventional paging systems presently in use.

Once the pager message has been transmitted in step 610 operation progresses to the billing subroutine 700 via step 612.

Figure 7:
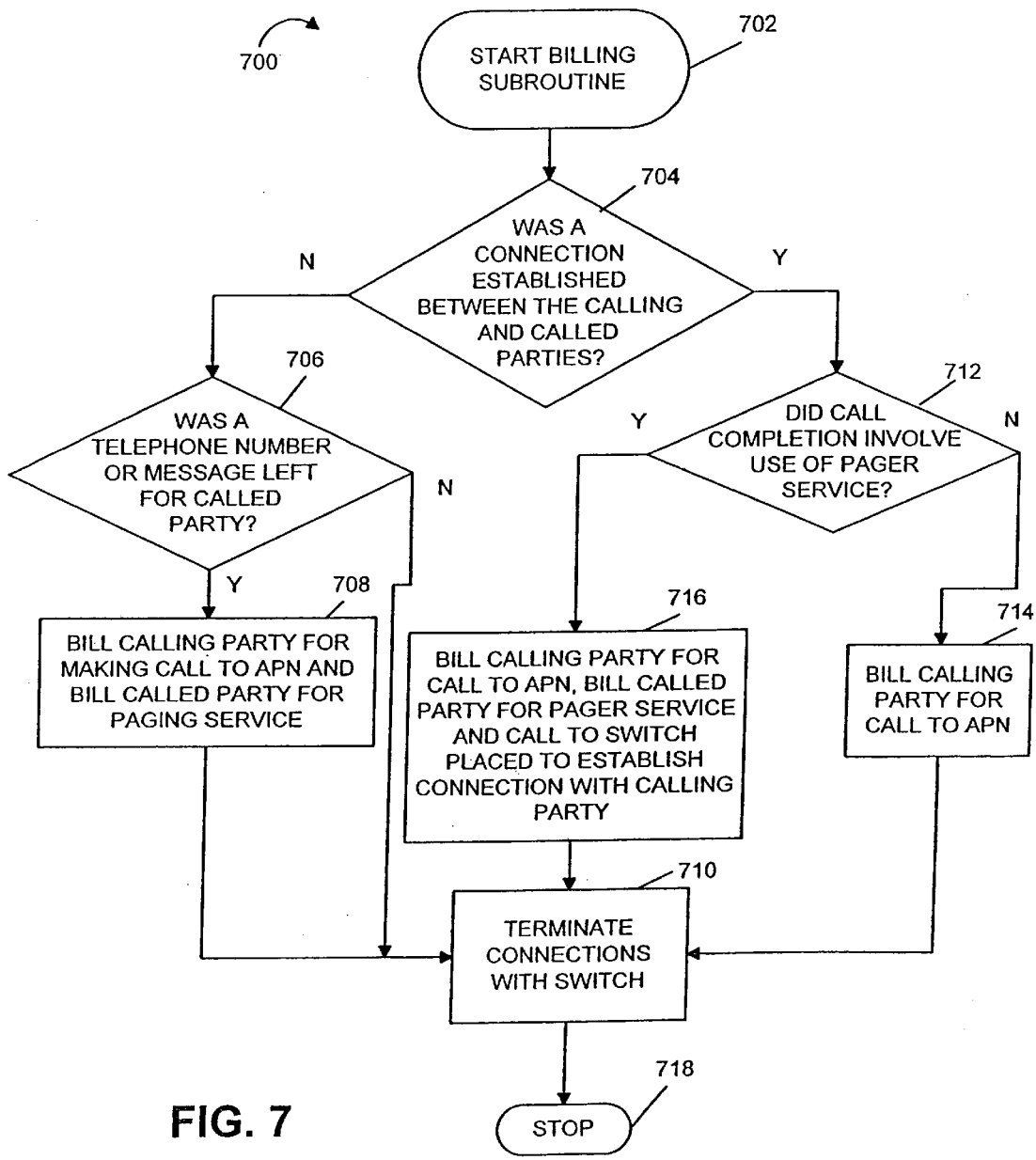
FIG. 7 illustrates the steps of a billing subroutine implemented in accordance with the present invention, suitable for use in combination with the routines illustrated in FIGS. 5 and 6.

The billing subroutine 700, illustrated in FIG. 7, begins with the start step 702. Operation progresses from the start step to step 704 wherein a determination is made as to whether or not a connection was established between the calling and called parties.

If no connection was established between the calling and called parties operation progresses to step 706 wherein a determination is made as to whether a telephone number and/or message was left for the called party. If no telephone number and/or message was left for the called party operation progresses to step 710 wherein the calling party's connection with the switch 400 is terminated.

If in step 706, it is determined that the calling party left a telephone number and/or message for the called party, operation progresses to step 708 wherein the calling party is billed for making the initial call to the APN 411 and the called party is billed for the paging service provided. After the appropriate parties are billed in step 708 operation progresses to step 710 wherein the calling party's connection with the switch 710 is terminated.

In step 704, if it is determined that a connection was established between the calling and called parties operation progresses to step 712. In step 712, a determination is made as to whether or not call completion involved the use of the pager service.

If pager service was not used to establish the call connection between the calling and called parties, operation progresses to step 714 where the calling party is billed for the call placed to the APN. From step 714 operation progresses to step 710 wherein the switch 400 terminates the connections with the calling and called parties.

If in step 712, it is determined that call completion involved use of pager service, operation progresses to step 716. In step 716 the calling party is billed for the call to the APN while the called party is billed for the use of the pager service. From step 716 operation progresses to step 710 wherein the switch 400 terminates the connections with the calling and called parties.

The billing routine of the present invention results in a calling party being billed only for a call to the APN. This will frequently be a local call. the enhanced telephone service subscriber is billed for paging services and calls placed by an enhanced telephone to establish the voice connection. Because the present invention can be used without incurring the costs associated with relatively expensive cellular telephone services, the costs to the enhanced telephone service subscriber for calls completed using the enhanced telephone service of the present invention may be considerably cheaper than if completed using a cellular telephone service.

From step 710, operation progresses to step 718 wherein the billing subroutine is stopped. At this stage the switch 400 will normally continue to wait for additional calls to receive and process.

Figure 8:
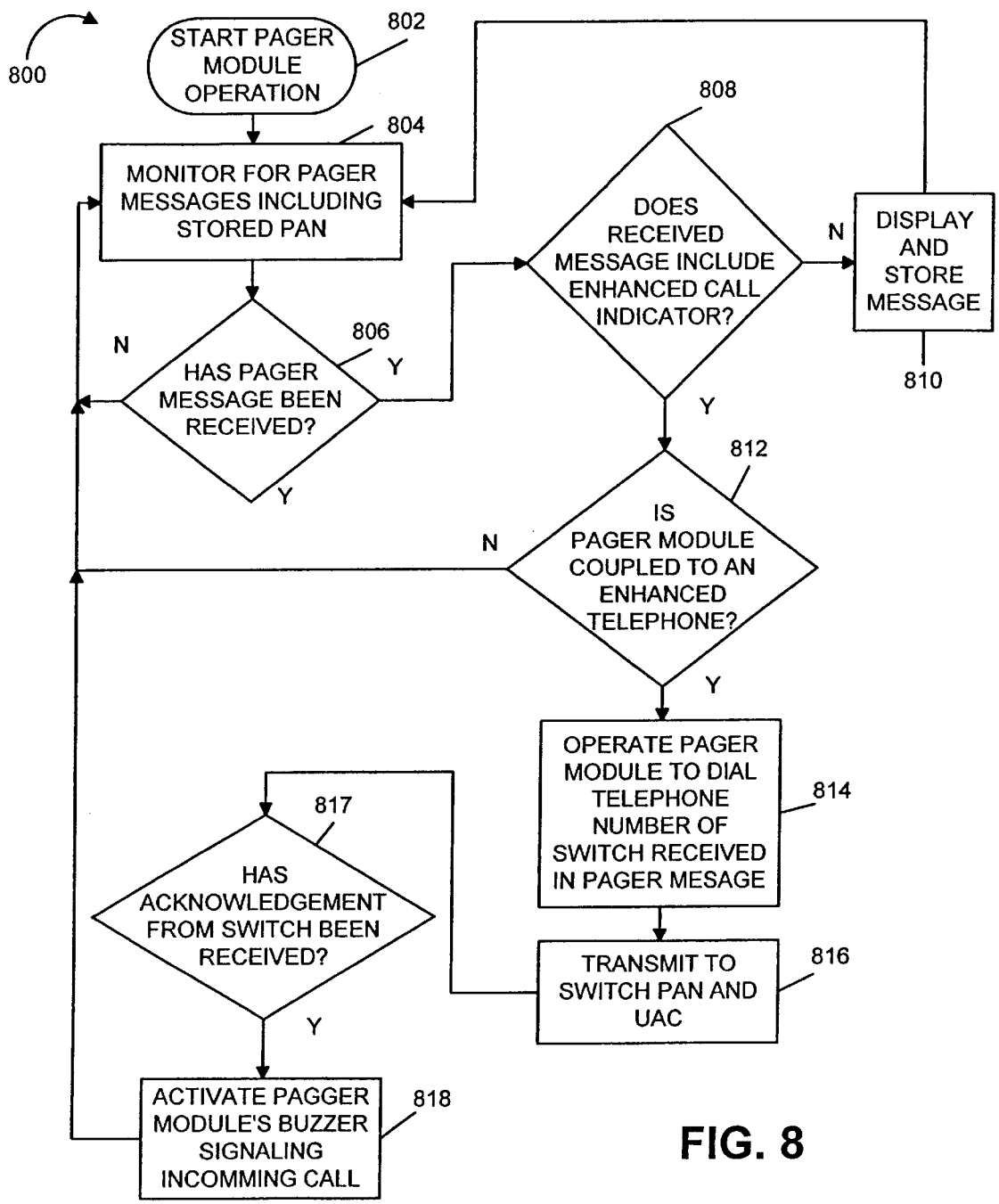
FIG. 8 illustrates the steps of a routine performed by a pager module in accordance with one embodiment of the present invention.

Operation of the pager module 300 in accordance with one embodiment of the present invention will now be briefly described with reference to FIG. 8 which illustrates the steps of a pager module control method 800. Operation of the pager module 300 begins in the start step 802 wherein various initialization operations are performed, e.g., by the CPU 320 under the direction of the control routines 334. Once initialization operations are completed, operation progresses to step 804 where the pager module 300 monitors for pager messages including a PAN which matches the PAN 328 stored in the pager module's memory. A periodic check is made in step 806 to determine if the pager module has received a pager message that matches the pager module's PAN 328.

If no message including the PAN 328 has been received, operation repeatedly proceeds from step 806 to the monitoring step 804 pending the receipt of a pager message including the PAN 328. If, in step 806 it is determined that a pager message having a matching PAN 328 has been received, pager module operation progresses to step 808. In step 808, the pager module 300, and the CPU 320 in particular, makes a determination as to whether or not the received pager message includes an enhanced call indicator.

If the received pager message does not include an enhanced call indicator, it is treated as a conventional pager message and, in step 810 is displayed and then stored for subsequent retrieval. After display and storage of the conventional pager message, pager module operation returns to step 804 wherein monitoring for additional pager messages occurs.

Receipt of a message including an enhanced call indicator indicates to the pager module 300 that the message represents an attempt by a waiting calling party to establish a voice connection with the pager module subscriber.

Accordingly, received pager messages that include an enhanced call indicator are treated differently than ordinary pager messages. In step 808 if it is determined that a received message includes an enhanced call indicator, operation progresses to step 812.

In step 812, the pager module 300 determines if it is inserted into an enhanced telephone and is thereby coupled to a PSN. If the pager model 300 is not inserted into an enhanced telephone 200 at the time the pager message including the enhanced telephone call indicator is received, the received message is ignored and operation progresses from step 812 to the monitoring step 804.

However, if in step 812, it is determined that the pager module is coupled to an enhanced telephone (either cellular or land-line) operation progresses to step 914. In step 914 the pager module's CPU 320 controls the DTMF generator 216 of the enhanced telephone into which is inserted, to place a call, using the telephone number included in the received pager message if one was included or the switch's telephone number 335 stored in the pagers memory. This results in the pager module 300 and enhanced telephone 200 into which it is inserted being coupled though a public telephone switching network to the switch 400 which initiated the pager message.

Once the connection with the switch 400 is established, the pager module 300 transmits to the switch 400 its PAN 328 which is used to identify the subscriber and to match the original calling party to the responding subscriber. In addition to transmitting its PAN 328 the pager module 300 also transmits to the switch its UAC 330. This is used by the switch 400 to verify the identity of the responding party.

After transmission of the PAN 328 and UAC 330 to the switch the pager module 300 waits to receive an acknowledgement signal from the switch 400 indicating that the calling party is still on the line and is about to be connected to the called party by the switch 400. Upon receiving the acknowledgement signal from the switch 400, the pager module 300 activates its BUZZER to signal an incoming call. At this time, the pager module 300 will update the value of the UAC 330 stored in its memory in embodiments where the UAC 330 is modified after each successful call transaction. The generated BUZZING signal may be made to sound like a regular telephone ring or be selected by placement of the switch 314 to assume one of a plurality of different sounds. In this manner, when multiple users of an enhanced telephone 200 of the present invention are located in the same room, they can each select a different buzzing or ringing sound to be made by their particular pager module 300 to signal the receipt of a call for them as opposed to one of the other enhanced telephone users in the room.

After activation of the pager module's BUZZER in step 818 pager operation progress once again to step 804 wherein the pager module once again resumes monitoring for messages directed to the pager module 300.

Figure 9:
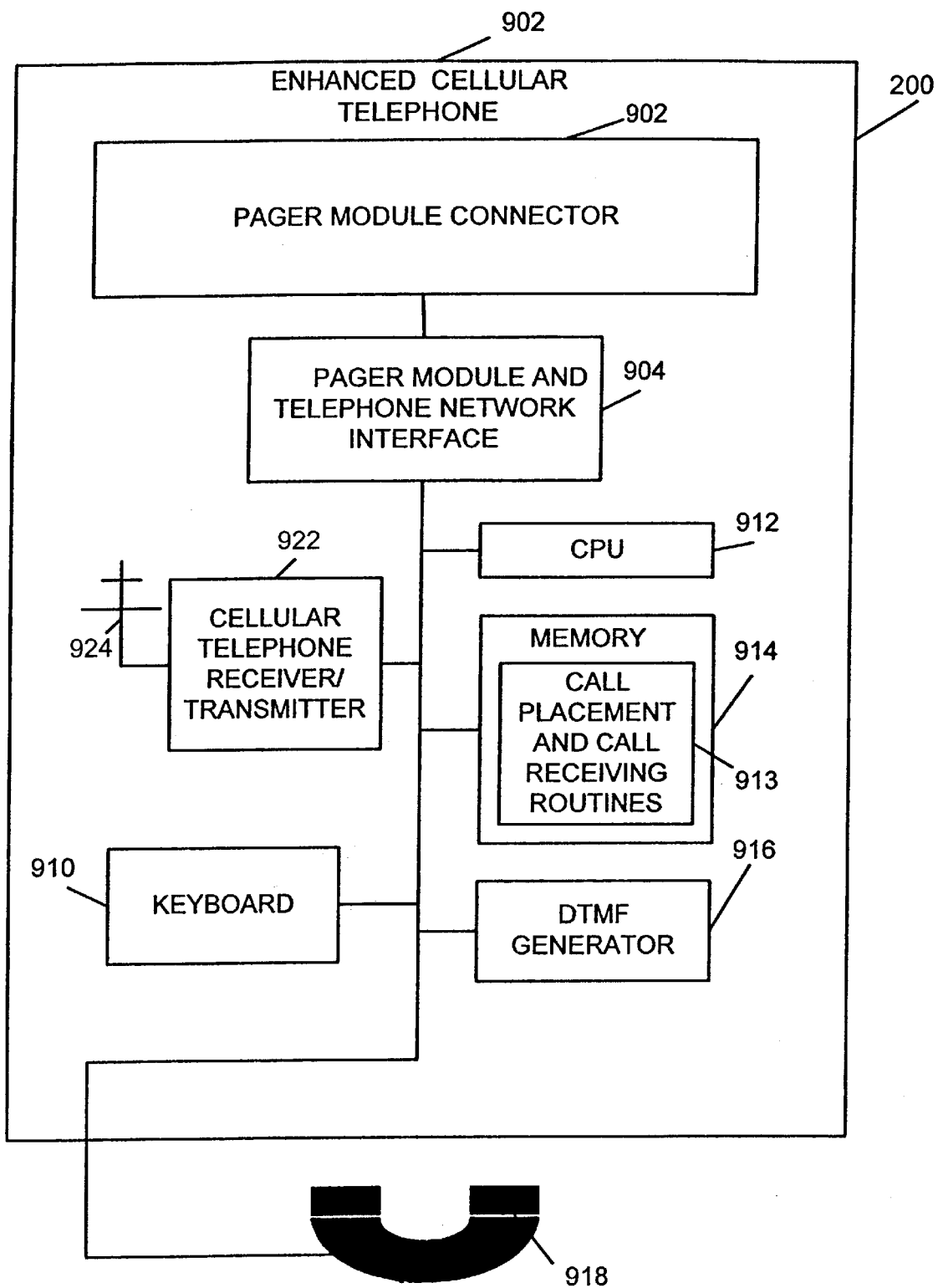
FIG. 9 illustrates a cellular telephone implemented in accordance with an embodiment of the present invention.

The present methods and apparatus of the present invention have described in the context of an embodiment wherein enhanced telephones are coupled to a PSN via conventional telephone lines as has been described above. However, the methods and apparatus of the present invention can also be combined with existing cellular telephone technology. Such an embodiment is particularly useful when the calling party is unaware of the called party's cellular telephone number and/or the enhanced telephone subscriber prefers to maintain his or her cellular telephone in an off state, e.g., for privacy reasons and/or to preserve battery power. Referring now to FIG. 9, there is illustrated an enhanced cellular telephone 900 implemented in accordance with one embodiment of the present invention. As illustrated, the enhanced cellular telephone 900 includes a pager module connector 902, a pager module and telephone network interface circuit 904, a CPU 912, an antenna 924, a cellular telephone receiver/transmitter 922, a keyboard 910, a DTMF generator 916, and handset 918 coupled together as illustrated in FIG. 9. The cellular telephone also includes a memory 914 which includes various routines including a call placement and call receiving routine. By using these routines 913, the CPU can control the enhanced cellular telephone 900 to make as well as receive cellular telephone calls. Accordingly, the enhanced cellular telephone of the present invention, unlike the known Telepoint cellular phones, is not limited to only placing calls.

In accordance with the present invention, pager module 300 can be turned on while leaving the cellular telephone receiver/transmitter 922 turned off. Upon receiving a pager message with an enhanced call indicator, the pager module 300 automatically activates the cellular telephone receiver/transmitter 922 and proceeds to place a call to a switch 400 as described above in regard to the pager module routine illustrated in FIG. 8.

Thus, use of the present invention allows a cellular telephone user to leave the cellular telephone receiver/transmitter 922 turned off thereby conserving battery power and avoiding the periodic transmission of location information to the telephone company while still being able to receive telephone calls via a cellular telephone network in a manner that is relatively transparent to both the person calling the APN and the cell phone operator. That is, when an enhanced cellular telephone subscriber receives a telephone call in accordance with the present invention the connection will be automatically established with the switch 400, the phone 900 will ring and all the enhanced cellular telephone subscriber need do is answer the call.

It will be apparent to one of ordinary skill in the art, in view of the above disclosure, that various modifications to the described apparatus and methods may be made while keeping within the scope of the present invention. For example, the pager module circuitry may be combined directly into an enhanced landline or enhanced cellular telephone. In such an embodiment instead of a fully functional pager module, a portable memory device, e.g., card with a magnetic strip, ROM, etc., may be carried around and inserted into an enhanced telephone incorporating pager circuitry. The portable memory device would store individual subscriber specific information such as the subscriber's PAN, UAC and optionally the telephone number of the switch primarily responsible for servicing the subscriber. The insertion of the memory device with the subscriber's PAN, UAC and optionally the switch telephone number would serve to activate the enhanced telephone.

In yet another embodiment of the present invention, instead of immediately dialing a switch's telephone number in response to a pager message, the enhanced telephone of the present invention into which a pager module is inserted may first generate a ringing or buzzing sound indicative of the receipt of a pager message including an enhanced telephone call indicator. A subscriber picking up the handset of the enhanced telephone during the period of time in which the enhanced telephone is generating such a ring or buzzing sound results in the telephone automatically dialing the telephone number of the switch where the calling party's call is parked. Such an embodiment has the advantage of avoiding dialing costs associated with contacting the switch where the call is parked, e.g., when the called party momentarily steps out of the room where the enhanced telephone is located and, is therefor temporarily unavailable to take the call.

Various other embodiments of the present invention are also possible.

What is claimed is:

1. A communication method, comprising the steps of:
   receiving a pager message indicative of a waiting call at a switch;
   operating a telephone device to respond, without intervention by the operator of the telephone device, to the pager message by automatically dialing a telephone number of the switch; and
   transmitting, to the switch, information identifying the responding party.

2. The communication method of claim 1, further comprising the steps of:
   receiving from the switch an acknowledgement signal; and
   generating a signal indicative of an incoming call in response to the acknowledgement signal.

3. The communication method of claim 1, further comprising the steps of:
   providing a portable pager device; and
   inserting the portable pager device into a telephone device.

4. The communication method of claim 3, wherein the telephone device is a land-line telephone apparatus coupled to a public switching network.

5. The communication method of claim 3, wherein the telephone device is a cellular telephone apparatus capable of receiving and placing cellular telephone calls.

6. A communication method comprising the steps of:
   operating a switch to receive a call directed to a phone number corresponding to a called party;
   transmitting, to the called, party a pager message indicating that a call is waiting at the switch;
   operating a telephone device capable of making and receiving telephone calls to automatically respond, without action by the operator of the telephone device, to the pager message by dialing a telephone number of the switch; and
   operating the switch to connect the called party to the telephone device in response to the call made by the telephone device.

7. The method of claim 6, further comprising the step of:
   determining, prior to transmitting the pager message, if a primary telephone associated with the called party is active.

8. The method of claim 6, further comprising the step of:
   operating the switch to transmit a call acknowledgement signal to the telephone device; and
   operating the telephone device to generate an audible signal indicative of a telephone call.

9. The method of claim 8, wherein the telephone device is a land-line telephone device coupled to the switch by a public switching network.

10. The method of claim 9, further comprising the step of:
    operating the switch to verify the identity of the party responding to the pager message prior to connecting the calling party to the telephone device.

11. The method of claim 10, further comprising the steps of:
    billing the calling party for the call directed to the assigned phone number; and
    billing the called party for the call made by the telephone device.

12. A portable pager device, comprising:
    a connector for coupling the portable pager device to a telephone device;
    a memory; and
    means for initiating, without intervention by the operator of the portable pager device, a telephone dialing operation in response to a pager message,
    wherein the means for initiating a telephone dialing operation include means for automatically initiating a telephone dialing operation to a switch parking a waiting telephone call, in the absence of human intervention, in response to a pager message indicative of the call waiting at the switch.

13. The portable pager device of claim 12, wherein the device further comprises a memory for storing a pager access number and the telephone number of a switch.

14. The portable pager device of claim 13, further comprising:
    means for generating an audible signal indicative of an incoming call in response to an acknowledgement signal received from the switch.

15. In a system having a local central office, a paging network, and a remote central office, a method for processing a call to a portable device located outside of a range of the local central office, the method comprising:
    a) parking, at the local central office, the call;
    b) sending, from the local central office, to the paging network, a message including a telephone number of the parked call and an enhanced call indication;
    c) paging, with the paging network, the portable device;
    d) determining whether or not a pager is attached to the portable device;
    e) if a pager is not attached to the portable device, indicating to a caller that placed the call, that the called party is being paged; and
    f) determining whether or not the called party responds to the page within a predetermined time period.

16. The method of claim 15 further comprising:
    g) if the called party does respond to the page within the predetermined time period, connecting the caller and the called party.

17. The method of claim 15 wherein if it is determined that a pager is attached to the portable device, initiating a call, from the portable device, to the local central office.

18. The method of claim 17 wherein the call initiated from the portable device to the local central office is initiated without intervention by an operator of the portable device.

19. The method of claim 1 wherein the step of verifying includes steps of determining whether a received PAN and UAC match an expected PAN and UAC.

20. The method of claim 10 wherein the step of verifying includes steps of determining whether a received PAN and UAC match an expected PAN and UAC.

* * * * *